United States Patent
Niu

(10) Patent No.: US 8,118,470 B2
(45) Date of Patent: Feb. 21, 2012

(54) LIGHT GUIDE PLATE AND BACKLIGHT MODULE USING THE SAME

(75) Inventor: Yan-Ni Niu, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 336 days.

(21) Appl. No.: 12/557,700

(22) Filed: Sep. 11, 2009

(65) Prior Publication Data

US 2010/0135041 A1    Jun. 3, 2010

(30) Foreign Application Priority Data

Dec. 1, 2008 (CN) .......................... 2008 1 0305884

(51) Int. Cl.
*F21V 7/04* (2006.01)

(52) U.S. Cl. ........ 362/624; 362/623; 362/626; 362/231; 362/84; 362/331

(58) Field of Classification Search .................. 362/601, 362/617, 627, 231, 84, 24
See application file for complete search history.

(56) References Cited

U.S. PATENT DOCUMENTS

2007/0025098 A1* 2/2007 Kim et al. ...................... 362/97

FOREIGN PATENT DOCUMENTS

| | | |
|---|---|---|
| CN | 1536411 A | 10/2004 |
| JP | 2004-109366 A | 4/2004 |
| JP | 2005-353650 A | 12/2005 |

* cited by examiner

*Primary Examiner* — Ali Alavi
(74) *Attorney, Agent, or Firm* — Altis Law Group, Inc.

(57) ABSTRACT

A light guide plate includes a plurality of micro dots. The micro dots are provided uniformly on one side of the light guide plate and are integrated with the light guide plate. Each dot is coated by a fluorescent layer, and the fluorescent layer emits light when excited by an ultraviolet light.

8 Claims, 3 Drawing Sheets

LIGHT GUIDE PLATE AND BACKLIGHT MODULE USING THE SAME

BACKGROUND

1. Technical Field

The present disclosure relates to light guide plates, and particularly to a light guide plate and a backlight module employing the light guide plate, the backlight module typically being part of an LCD (liquid crystal display).

2. Description of Related Art

LCD devices are thin, light in weight, and drivable by a low voltage, and thereby extensively employed in various electronic devices.

In an LCD device, usually a backlight module having a light source and a light guiding device is used to provide the needed illumination. The light source emits light beams to the light guiding device, which then transmits the light beams to illuminate liquid crystal molecules in a liquid crystal panel. It is important that the light guiding device transmits light beams to the liquid crystal panel uniformly. However, conventional backlight modules are not always able to provide uniform illumination, and may be unduly thick and heavy.

Therefore, there is room for improvement within the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the present light guide plate and the backlight module. Moreover, in the drawings, like reference numerals designate corresponding parts throughout the several views, in which.

DETAILED DESCRIPTION

Figure 1:
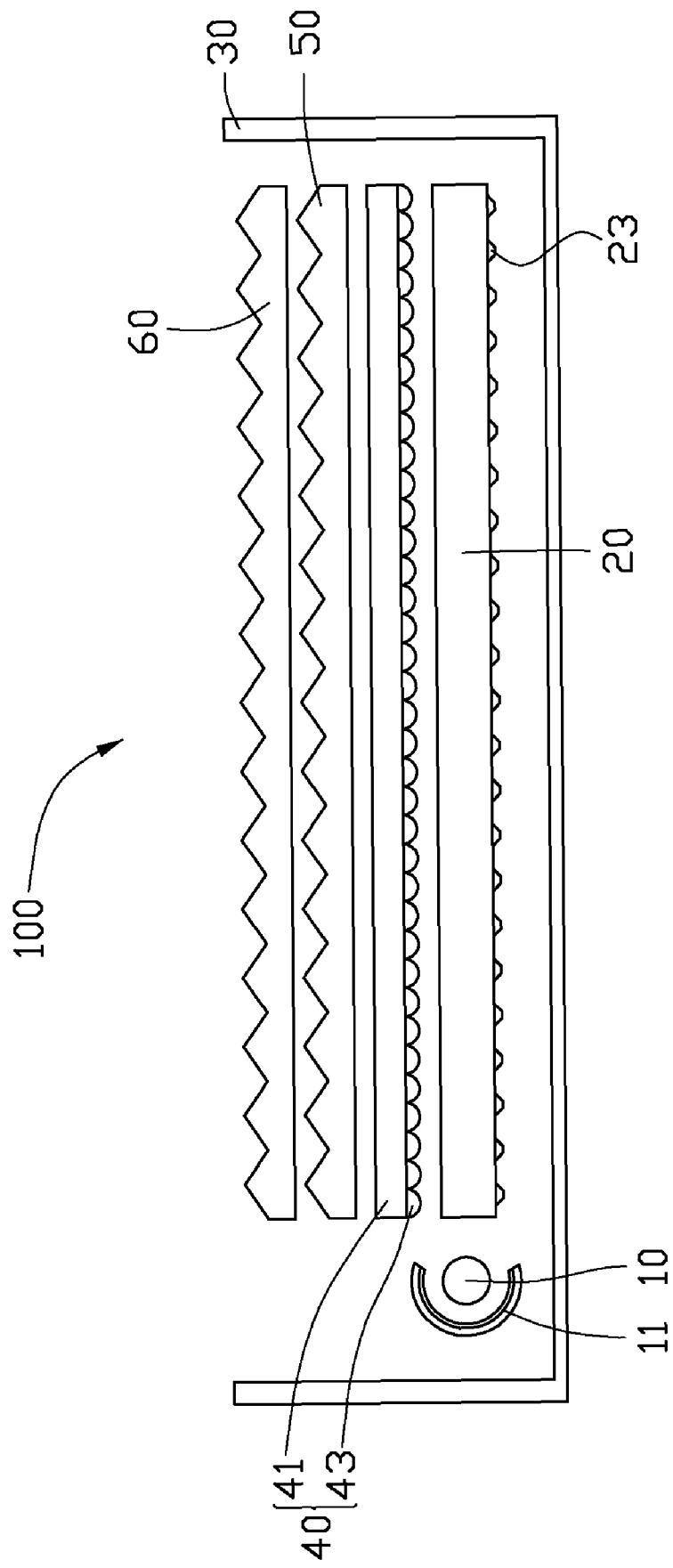
FIG. 1 is an isometric view of an exemplary backlight module.

Referring to FIG. 1, an exemplary backlight module 100 includes a light source 10, a light guide plate 20, a diffusing plate 40, a first prism plate 50 and a second prism plate 60. The light source 10, the light guide plate 20, the diffusing plate 40, the first prism plate 50 and the second prism plate 60, are received in a housing 30. In an exemplary embodiment, the housing 30 is an LCD housing.

The light source 10 may be an ultraviolet light source, and providean ultraviolet beam. A light source cover 11 is positioned at one side of the light source 10, and surrounds the side of the light source 10. The light source cover 11 functions mainly as a reflection element, to ensure that most of the light beams emitted from the light source 10 enter the light guide plate 20.

Figure 2:
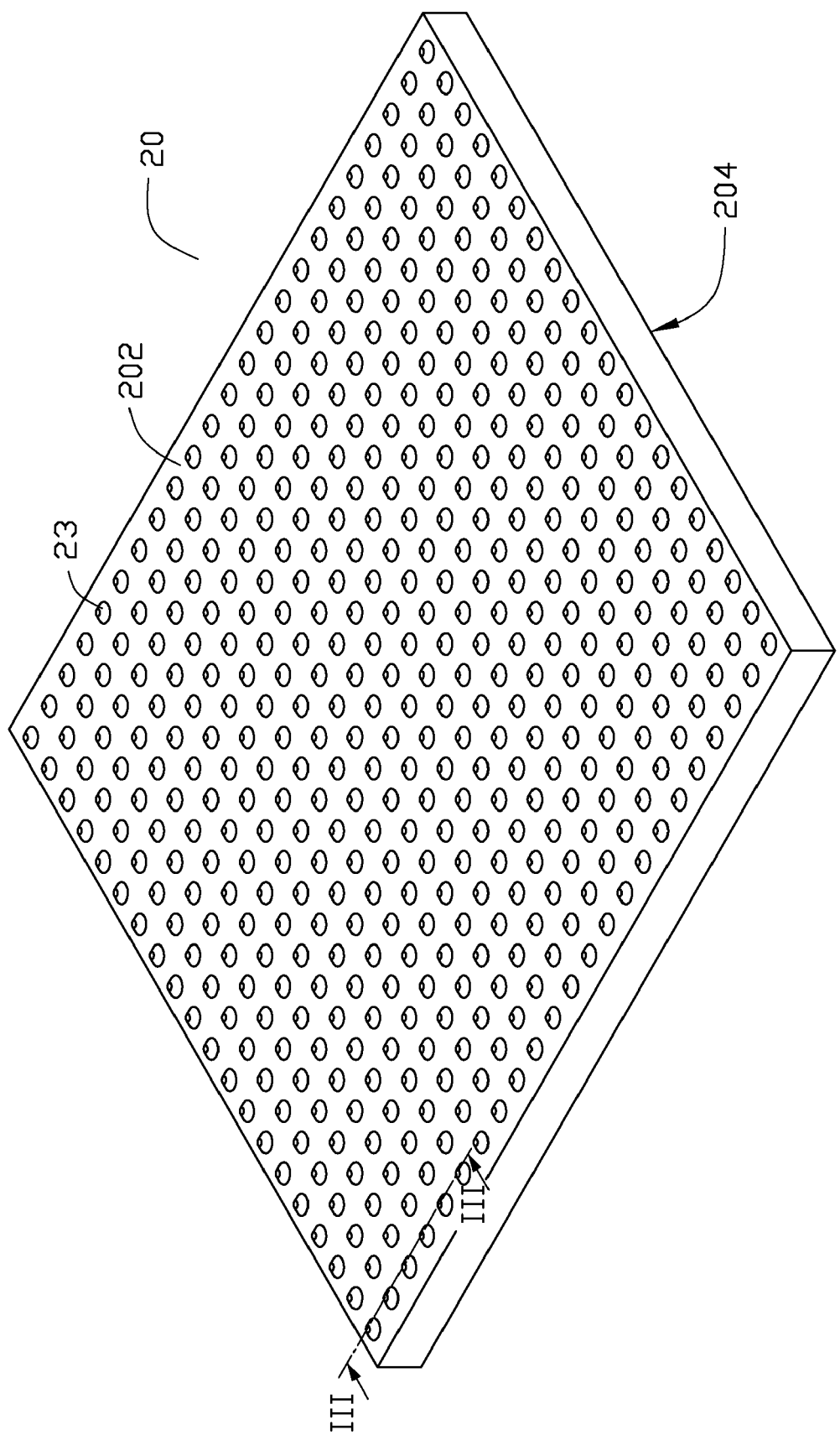
FIG. 2 is a schematic view of the exemplary light guide plate shown in FIG. 1.
Figure 3:
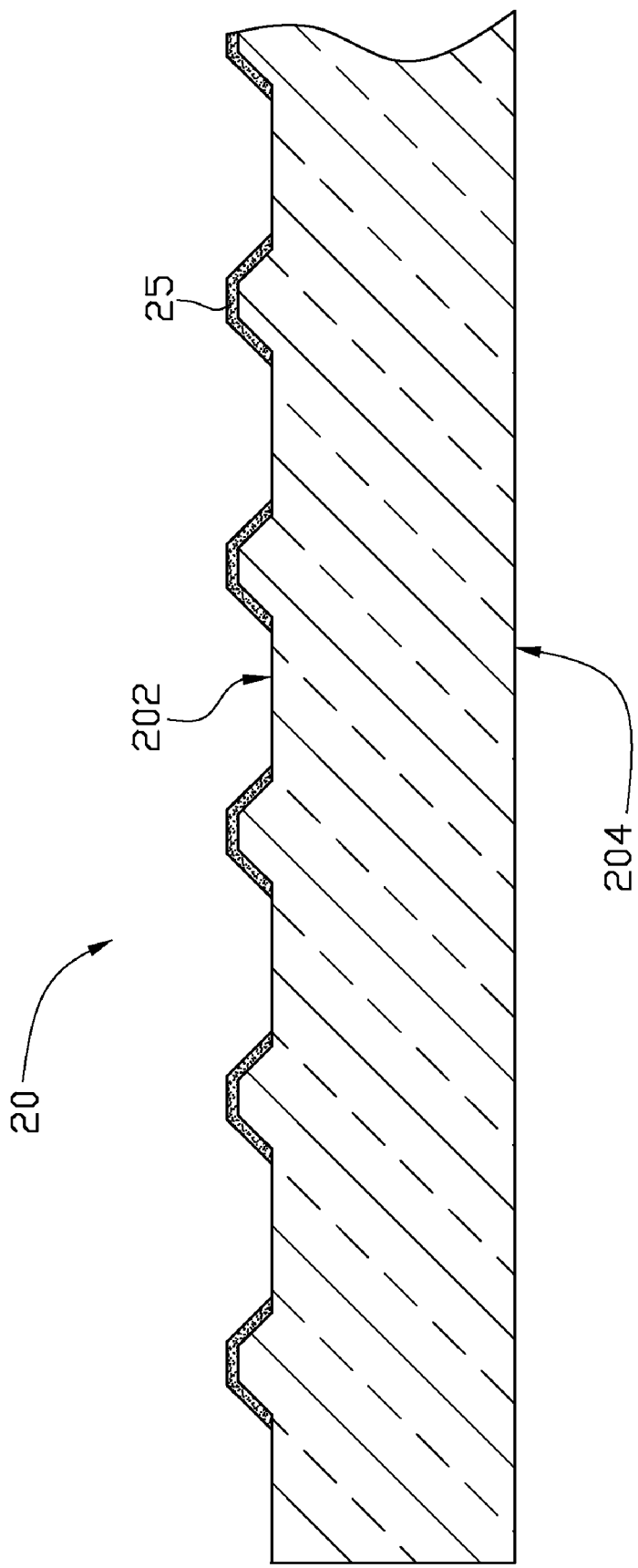
FIG. 3 is a partially, cross-sectional view of the exemplary light guide plate along III-III line shown in FIG. 2.

Referring to FIGS. 2 and 3, the light guide plate 20 is made of a transparent material such as glass or plastic. The plastic material can be any of acrylic, polyvinylchloride resin (PVC), polycarbonate (PC), polystyrene (PS), polypropylene (PP). The light guide plate 20 includes a bottom surface 202 and an emitting surface 204. The bottom surface 202 further includes a plurality of micro dots 23. The micro dots 23 are arranged in a uniform matrix formation. The micro dots 23 are generally frustum-shaped, and are formed by etching. The micro dots 23 on the bottom surface 202 of the transparent plate 20 can scatter and reflect incident light beams, as to almost completely eliminate internal reflection of the light beams and make the light beams more uniformly emit from the emitting surface 204. A largest diameter of each micro dot 23 is in the range from 20 micron to 40 micron. An orthogonal cross-section of each micro dot 23 is trapezium-shape, and subtends an angle in the range from about 20 to about 70 degrees.

Each micro dot 23 has a fluorescent layer 25 formed by electrostatic spraying. The material forming the fluorescent layer 25 has red (R), green (G), and blue (B) colors. The red fluorescent material may be zinc sulfide mixed with copper. The green fluorescent material may be sodium fluorescein. The red fluorescent material may be rhodamine, yttrium aluminium garnet. The ultraviolet light from the light source 10 will excite the fluorescent layer 25 to emit light.

The diffusing plate 40 includes a base 41 and a plurality of diffusing protrusions 43. The base 41 is made of polyethylene terephthalate (PET). The diffusing protrusions 43 are uniformly distributed on the base 41, and are integrally formed with the base 41. In general, the diffusing protrusions 43 are made of an organic material such as PMMA, polycarbonate or MCOC (metallocene Cyclic Olefin Copolymer). The diffusing protrusions 43 are hemispherical or sub-hemispherical, and can diffuse the light beams emitting from the emitting surface 204 of the transparent plate 20, in order to achieve a plane light source having uniform brightness. Since the base 41 and the diffusing protrusions 43 are of different materials, the brightness uniformity of the diffusing plate 40 is greatly improved.

The first prism plate 50 and the second prism plate 60 are made of transparent acrylics having a cross section of a right angled triangle. The emitted light beams eventually penetrate the first prism plate 50 and the second prism plate 60.

In use, the ultraviolet light source 10 excites the fluorescent layer 25 to emit light. The emitted light is guided by the light guide plate 20 to the diffuser plate 40, and then, the light is diffused by the diffuser plate 40 to penetrate through the first prism plate 50 and the second prism plate 60. The light source 10 can be light emitting diodes (LED) emitting blue-ray or ultraviolet-ray. The light emitted by the blue-ray or ultraviolet-ray LED can enhance the energy-transition efficiency of the fluorescent layer 25 and can also promote the illumination obviously. Moreover, the mirco dots 23 on the bottom surface 202 of the transparent plate 20 can scatter and reflect incident light beams, to almost completely eliminate internal reflection of light beams and make the light beams uniformly emit from the emitting surface.

It is to be understood that the micro dots 23 may be cylindrical, hemispherical, sub-hemispherical, parallelepiped-shaped.

It is believed that the present embodiments and their advantages will be understood from the foregoing description, and it will be apparent that different changes may be made thereto without departing from the spirit and scope of the invention or sacrificing all of its material advantages, the examples hereinbefore described merely being preferred or exemplary embodiments of the invention.

What is claimed is:

1. A light guide plate comprising:
   a plurality of micro dots provided uniformly on one side of the light guide plate and integrated with the light guide plate;
   wherein each dot is coated by a fluorescent layer, and the fluorescent layer emits light when excited by an ultraviolet light, each dot is generally frustum-shaped, a largest diameter of each micro dot is in the range from 20 microns to 40 microns, and an orthogonal cross-section of each micro dot subtends an angle in the range from about 20 degrees to about 70 degrees.

2. The light guide plate as claimed in claim 1, wherein the micro dots are arranged in a uniform matrix formation.

3. The light guide plate as claimed in claim 1, wherein the fluorescent layer is made of red, green, or blue fluorescent powder.

4. A backlight module comprising:
an ultraviolet light source;
a light guide plate, the ultraviolet light source positioned at one side of the light guide plate; the light guide plate forming a plurality of micro dots provided uniformly on one side thereof;
wherein each dot is coated by a fluorescent layer, and the fluorescent layer emits light when excited by the ultraviolet light source, each dot is generally frustum-shaped, a largest diameter of each micro dot is in the range from 20 microns to 40 microns, and an orthogonal cross-section of each micro dot subtends an angle in the range from about 20 degrees to about 70 degrees.

5. The backlight module as claimed in claim 4, further comprising a diffuser plate, the diffusing plate installed on the light guide plate, and used to diffuse the light guided by the light guide plate.

6. The backlight module as claimed in claim 5, wherein the diffusing plate includes a base and a plurality of diffusing protrusions, the diffusing protrusions are uniformly distributed on the base.

7. The backlight module as claimed in claim 4, wherein the micro dots are arranged in a uniform matrix formation.

8. The backlight module as claimed in claim 4, wherein the fluorescent layer is made of red, green, or blue fluorescent powder.

* * * * *